May 27, 1952        J. C. PRICE        2,598,432

PHASE SHIFTING NETWORK

Filed March 29, 1949

Inventor:
John C. Price,
by    *Orwell S. Mack*
His Attorney.

Patented May 27, 1952

2,598,432

UNITED STATES PATENT OFFICE 2,598,432

PHASE SHIFTING NETWORK

John C. Price, Schenectady, N. Y., assignor to General Electric Company, a corporation of New York Application March 29, 1949, Serial No. 84,208

16 Claims. (Cl. 323—122)

My invention relates to phase shifting networks, and more particularly to static impedance phase shifting networks utilizing a combination of fixed and variable reactance elements for effecting a variation in phase relation between an output voltage of the network relative to an input voltage of the network.

An important use of phase shifting networks has been in connection with tube rectifiers and inverters in order to effect a shift in phase of the voltage applied to a control electrode of the rectifier or inverter tubes relative to the anode voltage, and thereby to control the operation of such rectifiers and inverters. Many forms and various types of impedance phase shift circuits have been proposed or used in the past, but the forms and types heretofore used have had one or more of the following disadvantages, namely, variation of output voltage with change in phase, high electrical losses particularly when utilizing a resistor in one of the impedance arms, limitations in maximum degree of phase shift obtainable without undue complication of circuits, and appreciable complexity of circuits where the phase variation is obtained with variable reactors alone.

It is an object of my invention to provide a new and improved impedance phase shifting network having substantially lower electrical losses than those heretofore proposed or used, an output voltage which remains substantially constant in magnitude throughout the full range of phase shift angle of the network, and a continuous phase shift over a substantial portion of 360° with reasonable variation in one impedance.

In accordance with my invention, I utilize a network comprising at least two reactance elements such as a fixed inductive reactance and a variable inductive reactance, as illustrated, connected in series relation across components of input voltages having various phase relations which I refer to as the "input angle" and take from the network an output voltage between a junction point of the reactive elements and a neutral or other displaced output terminal on the network for energizing a load circuit, the voltage of which is to be shifted in phase relative to the input voltage. The value of the fixed reactance element of the network, as well as the impedance characteristic of the load, are functions of the input angle and the output voltage.

My invention will be better understood from the following description taken in connection with the accompanying drawing, and its scope will be pointed out in the appended claims.

Figure 1:
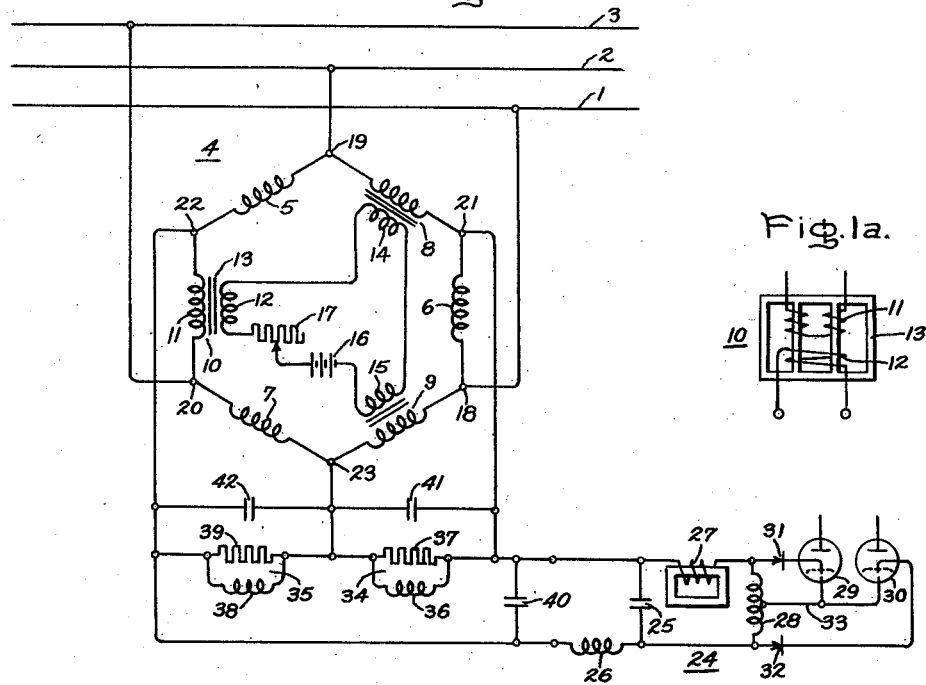
Figure 1A:
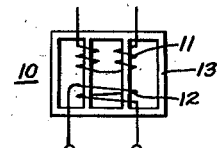
Figure 2:
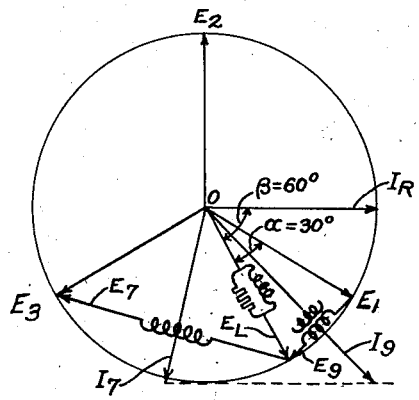
Figure 3:
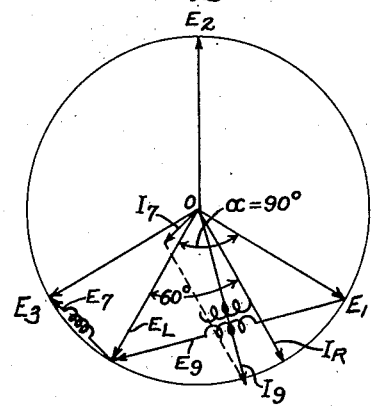

In the drawing, Fig. 1 is a diagrammatic representation of one embodiment of my invention as used with a three phase circuit; Fig. 1a is a diagrammatic representation of a suitable form of variable inductive reactance shown schematically in Fig. 1; Fig. 2 is a vector diagram of the embodiment of my invention illustrated in Fig. 1 showing a graphic solution of the network voltages and currents for one phase to neutral with a 30° phase shift angle of the output voltage, and Fig. 3 is a vector diagram showing voltage and current relations similar to that shown in Fig. 2 when the output voltage is shifted 90°.

In Fig. 1 of the drawing, I have illustrated a polyphase network which is particularly useful for rectifiers and inverter circuits since it is connected to operate with an "input angle" of 120° which is directly obtained from a three phase power supply. The term "input angle" is used throughout the specification to denote the angle between two of the power supply voltage vectors applied to any given pair of phase shifting elements of the network. It will be understood, however, as the description proceeds, that various input angles may be selected with due regard to the constancy of the load impedance and its power factor angle to obtain the desired objects which I have outlined above, with greater or smaller maximum angles of phase shift in dependence upon the conditions selected.

A three phase alternating current supply circuit is indicated by the conductors 1, 2 and 3, and it is assumed that as in the usual three phase circuit there are provided three voltages of equal magnitude which are displaced 120° in time-phase. The phase shifting network 4 comprises at least two low loss and preferably (if it were possible zero loss reactance elements connected in series relation, with one of the elements having a fixed value of reactance and the other having a reactance variable from substantially zero to infinity. In the broader aspects of my invention, I include in the term "reactance element" both an inductive reactance element and a capacitive reactance element in conformity with accepted terminology. For ease in distinguishing between an inductive reactance and a capacitive reactance, I will refer to the capacitive reactance as being of opposite sign from that of an inductive reactance. In like manner, the distinction between a lagging power factor and a leading power factor will be made by referring to a power factor of opposite sign when comparison is made to a lagging power factor.

Since the general case is ofttimes better understood from a consideration of a specific example, I have illustrated the network 4, suitable for three phase applications, as comprising three fixed inductive reactance elements 5, 6 and 7 arranged alternately with three variable inductive reactance elements 8, 9 and 10 and all connected in series relation in mesh connection and for simplicity of illustration in the form of a six-sided polygon, although the conventional three-phase delta arrangement could equally well represent the network so that a fixed and variable reactance element would appear in each side of the delta. The variable reactance elements 8, 9 and 10 may be of various forms without departing from my invention in its broader aspects, but it has been found in practice that the saturable reactor form illustrated gives good results and adapts itself well to phase shift controls now used in practice. This variable reactance element 10 comprises an alternating current winding 11 connnceted in the alternating current circuit with the fixed reactors 5, 6, and 7 and is provided with a direct current saturating winding 12 arranged on a core 13 in any suitable manner to effect the desired change in reactance by D.-C. saturation. In Fig. 1a, I have shown a suitable structure for variable reactance 10 in which the core 11 is a four-legged core with the A.-C. windings arranged in series relation on each of the middle legs to provide components of flux in additive relation with respect to these legs and a D.-C. winding 12 arranged over the two legs. The variable reactance elements 8 and 9 are illustrated as being of the same form as that of element 10 and are provided respectively with D.-C. windings 14 and 15. The D.-C. windings 12, 14 and 15 are interconnected and, as shown, in series relation to be energized from a suitable D.-C. source illustrated as a battery 16 and provided with any suitable means 17 to control the D.-C. saturating current of the variable reactance elements 8, 9 and 10. The particular form of the control means 17 is not a part of my invention, but if it is desired to obtain a quick shift in phase of the output voltage it is helpful to have a control which effects a quick change in the direct current and thereby a quick change in the reactance. One form of control which has shown good results in practice is that described in U. S. Patent 2,435,188 granted February 3, 1948 upon an application of B. D. Bedford in which an amplidyne generator responsive to the condition to be controlled is arranged to vary the D.-C. current in a saturable reactor type of phase shift circuit for a tube converter.

The network 4 is provided with input terminals 18, 19 and 20 and with output terminals 21, 22 and 23 which, in this particular case, alternate with the input terminals. The input terminals 18, 19 and 20 are connected respectively to the phase conductors 1, 2 and 3 so that the input angle of the network is 120°. A load circuit 24 is connected across the output terminals 21 and 22, and as illustrative of the type of load circuit contemplated I have shown a known type of ignitron firing circuit as described in U. S. Patent 2,362,294 granted November 7, 1944, upon an application of A. H. Mittag. This circuit typically comprises a firing capacitor 25 connected to be energized through a linear reactor 26 from the output terminals of the phase shift circuit. The firing capacitor 25, when fully charged, discharges through a self-saturating or firing reactor 27 to energize an auto-transformer 28 from which ignitors 29 and 30 of two ignitrons having anode voltages displaced 180° in phase are connected to be energized. The ignitor 29 is connected to be energized through a rectifier 31 from one end terminal of the transformer 28, and the ignitor 30 is connected to be energized through a rectifier 32 from the opposite terminal of transformer 28. A return conductor 33 is connected between the common cathode terminals of the ignitors and the midtap of the transformer 28. This circuit, despite the use of the firing capacitor 25, has a lagging power factor. Although the remaining two load circuits 34 and 35 for the specific application chosen for explanation are intended to represent similar firing circuits of the type shown by load circuit 24, I have represented these load circuits schematically so that load circuit 34 connected across output terminals 21 and 23 comprises an inductance 36 and a resistance 37, and load circuit 35 connected across output terminals 22 and 23 comprises an inductance 38 and a resistance 39. The particular point of significance for the application of the phase circuit illustrated is that each load circuit has a lagging power factor.

In accordance with my invention, the load impedance should be substantially constant and its power factor angle should be half of the input angle and opposite in sign from the reactive characteristic of the phase shift network impedance. While I have shown in the drawing a delta or mesh connected load, it will be understood that the term load impedance, designated Z herein, actually is an impedance for one leg of a Y or star connected load which load would draw a value of volt-amperes from the output terminals that is equal to the volt amperes drawn from the output terminals with the load arranged in mesh as illustrated. A further general feature of the network is that the value of the reactance of the fixed reactance element should be twice the sine of the power factor angle times Z the load impedance. In the particular case illustrated with a power input angle of 120° and inductive reactance elements in the phase shift network, it is required that the power factor angle of the load impedance be 60° leading or 50% leading power factor. Since the particular load illustrated has a lagging power factor, I connect a capacitor 40 across the load circuit 24 and capacitors 41 and 42 across the load circuits 34 and 35, respectively, each being of such a value as to bring its associated load circuit to the desired power factor angle of 60° leading. It will, of course, be understood that, depending upon the characteristics of the load, the capacitance value of the several capacitors may vary or the capacitors may even be omitted if the load impedance of itself has the required power factor angle.

With a 120° input angle as illustrated and the load impedance Z having a leading power factor angle of 60° (½ the input angle), the value in ohms of fixed reactors 5, 6 and 7 respectively is:

$$2 \text{ sine } 60° \; Z = 2\frac{\sqrt{3}}{2} Z \text{ or } Z\sqrt{3}$$

With the conditions as specified for a 120° input angle, the phase shift network has a theoretical maximum phase shift of 240° or, in the general case, twice the input angle. The closeness of approach to the maximum phase shift angle depends upon how close one can design the variable reactor to have the minimum and maximum limiting conditions of zero and infinity. The size and cost of the equipment are largely dependent upon the desired angle of shift and the amount of power consumed by the controlled circuit. For a given application, a network which produces only the desired maximum phase shift with reasonable variation in circuit parameters is more economical than one which gives a shift of greater magnitude. Hence, one great advantage of this type of network is its adaptability to various input conditions and phase shift requirements.

Fig. 2 is a vector diagram showing the solution of the network voltages for the conditions existing in the illustrated embodiment of Fig. 1 where the input angle is 120° and the phase shift angle is 30°. I have shown the input voltages $E_1$, $E_2$ and $E_3$ to the neutral of the delta or mesh connection and shown a branch of the network for one phase of the supply voltage. The vector $E_L$ represents the desired output voltage which is drawn equal to and at an angle of 30° lag with respect to the voltage vector $E_1$. This establishes the voltages $E_9$ and $E_7$ which must appear across the variable reactor 9 and the fixed reactor 7 respectively. The directions of the currents $I_7$ and $I_9$ producing the voltage drop across reactors 7 and 9, respectively (which are assumed to have no resistance), are then also known and are in quadrature with the respective voltage drops $E_7$ and $E_9$. The resultant current $I_R$ is at an angle B of 60° lead with respect to the output voltage $E_L$, since the load power factor is 50% leading. Since the voltages in all parts of the circuit may be determined, the values of the phase shift reactances required for each value of phase shift can be scaled from a series of vector diagrams or the values may be calculated by the application of mathematics known to those skilled in the art.

In Fig. 3 I have shown a similar vector diagram showing the solution of the network under the same conditions as have been outlined above, with the voltage and current vectors similarly indicated but under the conditions of a shift in the output voltage $E_L$ of 90° as a result in an assumed increased value for the variable reactor 9. The range of phase shift theoretically may be varied from zero lag when the variable reactor 9 is reduced to zero (or fully saturated in the form illustrated) to 240° lag when the variable reactor 9 is at its maximum value or the D.-C. saturating current is reduced to zero.

The features characterizing the specific network just described are that the output voltage will remain constant in magnitude with a constant input voltage at any phase shift angle between the maximum and minimum values if the load impedance Z is substantially fixed and constant and has a leading power factor of 50% and if the value of the fixed reactor of the network is equal to the $\sqrt{3}$ times the load impedance Z.

As previously pointed out, these relations vary depending upon the value of the input angle and it can be readily shown, vectorially and mathematically, that when the input angle is 90 degrees the power factor angle should be 45 degrees or 70 per cent power factor, and the value of the fixed reactor of the network should be equal to the $\sqrt{2}$ times the load impedance Z to provide a constant voltage output and a maximum theoretical phase shift angle of twice the input angle or 180°.

With a readily attainable input angle of 60°, it can be shown, vectorially and mathematically, that the power factor angle should be 30° or 86 per cent power factor and the value of the fixed reactor of the network should be equal to the load impedance Z to provide a constant voltage output and a maximum theoretical phase shift angle of twice the input angle or 120°.

As previously indicated, my invention in its broader aspects may be practiced with capacitive reactive fixed and variable elements in the network so that in such case the power factor of the load is required to be of opposite sign, or lagging.

While I have shown and described a particular embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. An impedance phase shifting network comprising a fixed reactive element and a variable reactive element connected in series relation therewith to form a branch circuit of said network, input terminals provided at the extremities of said branch circuit and having an intermediate junction between said fixed and variable reactive elements constituting one output terminal, circuit connections for impressing between said input terminals voltage components having a predetermined phase displacement therebetween and constituting the voltage input angle of said network, a second output terminal provided at a point of said network dependent upon said input angle, and an output circuit connected to said output terminals and having a substantially constant value of impedance and a power factor angle equal to one-half of said input angle and of opposite sign to the reactive characteristic of said network.

2. An impedance phase shifting network comprising a fixed reactive element and a variable reactive element of the same sign as said fixed reactive element and connected in series relation therewith to form a branch circuit of said network, input terminals provided at the extremities of said branch circuit and having an intermediate junction between said fixed and variable reactive elements constituting one output terminal, circuit connections for impressing between said input terminals voltage components having a predetermined phase displacement therebetween and constituting the voltage input angle of said network, a second output terminal provided at a point of said network dependent upon said input angle, and an output circuit connected to said output terminals and having a substantially constant value of impedance and a power factor angle equal to one-half of said input angle and of opposite sign to the reactive characteristic of said network.

3. An impedance phase shifting network comprising a fixed reactive element and a variable reactive element of the same sign as said fixed reactive element and connected in series relation therewith to form a branch circuit of said network, input terminals provided at the extremities of said branch circuit and having an intermediate junction between said fixed and variable reactive elements constituting one output terminal, circuit connections for impressing between said input terminals voltage components having a predetermined phase displacement therebetween and constituting the voltage input angle of said network, a second ouput terminal provided at a point of said network dependent upon said input angle, an output circuit connected to said output terminals, and reactive means connected to said output circuit of opposite sign from the reactive characteristic of said branch circuit and of a value such that the power factor angle of the output circuit is substantially equal to one-half said input angle.

4. An impedance phase shifting network comprising a fixed inductive reactive element and a variable inductive reactive element connected in series relation therewith to form a branch circuit of said network, input terminals provided at the extremities of said branch circuit and having an intermediate junction between said fixed and variable inductive reactive elements constituting one output terminal, circuit connections for impressing between said input terminals voltage components having a predetermined phase displacement therebetween and constituting the voltage input angle of said network, a second output terminal provided at a point of said network dependent upon said input angle, and an output circuit connected to said output terminals and having a substantially constant value of impedance and a leading power factor angle equal to one-half of said input angle.

5. An impedance phase shifting network comprising a fixed inductive reactive element and a variable inductive reactive element connected in series relation therewith to form a branch circuit of said network, input terminals provided at the extremities of said branch circuit and having an intermediate junction between said fixed and variable inductive reactive elements constituting one output terminal, circuit connections for impressing between said input terminals voltage components having a predetermined phase displacement therebetween and constituting the voltage input angle of said network, a second output terminal provided at a point of said network dependent upon said input angle, an output circuit connected to said output terminals, and a capacitor connected to said output circuit of a value such that the power factor angle of the output circuit is one-half said input angle.

6. An impedance phase shifting network comprising a fixed inductive reactive element and a variable inductive reactive element connected in series relation therewith to form a branch circuit of said network, input terminals provided at the extremities of said branch circuit and having an intermediate junction between said fixed and variable inductive reactive elements constituting one output terminal, circuit connections for impressing between said input terminals voltage components having a predetermined phase displacement therebetween and constituting the voltage input angle of said network, a second output terminal provided at a point of said network dependent upon said input angle, and an output circuit connected to said output terminals and having a substantially constant value of impedance Z and a leading power factor angle equal to one-half of said input angle, the impedance of said fixed reactive element being twice the sine of the power factor angle of said load times Z.

7. An impedance phase shifting network comprising a fixed inductive reactive element and a variable inductive reactive element connected in series relation therewith to form a branch circuit of said network, input terminals provided at the extremities of said branch circuit and having an intermediate junction between said fixed and variable inductive reactive elements constituting one output terminal, circuit connections for impressing between said input terminals voltage components having a predetermined phase displacement therebetween and constituting the voltage input angle of said network, a second output terminal provided at a point of said network dependent upon said input angle, and an output circuit connected to said output terminals for connection to a load impedance of substantially constant value and a leading power factor angle equal to one-half of said input angle.

8. An impedance phase shifting network comprising a fixed inductive reactive element and a variable inductive reactive element connected in series relation therewith to form a branch circuit of said network, input terminals provided at the extremities of said branch circuit and having an intermediate junction between said fixed and variable inductive reactive elements constituting one output terminal, circuit connections for impressing between said input terminals voltage components displaced in phase 120 electrical degrees and constituting the voltage input angle of said network, a second output terminal provided at a point of said network dependent upon said input angle, and an output circuit connected to said output terminals and having a substantially constant value of impedance and 50% leading power factor, the value in ohms of said fixed inductive reactive element being equal to the $\sqrt{3}Z$.

9. An impedance phase shifting network comprising a fixed reactor having a winding and a saturable reactor provided with a core and a first winding thereon connected in series relation with the winding of said fixed reactor and also being provided with a second winding on said core, input terminals provided at the extremities of said series connected windings and having an intermediate junction between said series connected windings constituting one output terminal, circuit connections for impressing between said input terminals voltage components having a predetermined phase displacement therebetween and constituting the voltage input angle of said network, a second output terminal provided at a point of said network dependent upon said input angle, an output circuit connected to said output terminals and having a substantially constant value of impedance and a leading power factor angle equal to one-half of said input angle, and direct current means for varying the energization of the second winding of said saturable reactor so as to vary the reactance thereof from a substantially unsaturated value to a saturated value to effect a shift in the phase relation between said output voltage and said input voltage in excess of said input voltage angle.

10. An impedance phase shifting network comprising a fixed reactor having a winding and a saturable reactor provided with a core and a first winding thereon connected in series relation with the winding of said fixed reactor and also being provided with a second winding on said core, input terminals provided at the extremities of said series connected windings and having an intermediate junction between said series connected windings constituting one output terminal, circuit connections for impressing between said input terminals voltage components having a predetermined phase displacement therebetween and constituting the voltage input angle of said network, a second output terminal provided at a point of said network dependent upon said input angle, an output circuit connected to said output terminals for connection to a load device having a substantially constant value of impedance Z and a leading power factor angle equal to one-half of said input angle, direct current means for varying the energization of the second winding of said saturable reactor so as to vary the reactance thereof from a substantially unsaturated value to a saturated value, the impedance of said fixed reactor being equal to twice the sine of the power factor angle of said load times Z.

11. A phase shifting network comprising a plurality of input terminals, a polyphase input circuit for applying to the respective input terminals voltages equally displaced in phase at an angle in electrical degrees constituting the input angle of said network, a pair of serially connected fixed and variable reactive elements connected between each pair of input terminals to form said network, a plurality of output terminals provided at points around said network which alternate with said input terminals, and an output circuit connected to said output terminals for connection to a load circuit having a power factor angle opposite in sign to the reactive characteristic of said network and of a value in degrees equal to one-half the phase displacement between the voltages of adjacent pairs of input voltage terminals.

12. A phase shifting network comprising a plurality of input terminals, a polyphase input circuit for applying to the respective input terminals a system of polyphase voltages equally displaced in phase at an angle in electrical degrees constituting the voltage input angle of said network, a branch circuit connected between each pair of input terminals to form a network and each branch circuit comprising a reactor with a fixed value of inductive reactance and a variable reactor connected in series relation therewith, means for varying the inductive reactance of the variable reactor in each branch circuit, a plurality of output terminals provided at points around said network which alternate with said input terminals, and an output circuit connected to said output terminals for connection to a load circuit of impedance Z having a leading power factor angle equal to one-half of said input angle, the value in ohms of the impedance of said fixed reactor being equal to twice the sine of said power factor angle times Z.

13. A phase shifting network comprising a plurality of input terminals, an input circuit for applying to the respective input terminals a balanced system of polyphase voltages, the angle in electrical degrees between the voltage components of such system constituting the voltage input angle of said network, a pair of serially connected fixed and variable reactive elements connected between each pair of input terminals to form said network, a plurality of output terminals provided at points around said network which alternate with said input terminals, an output circuit connected to said output terminals for connection to a load circuit, and reactive means connected to each of said output circuits of opposite sign from the reactive characteristic of each branch circuit and of a value such that the power factor angle of each output circuit is substantially equal to one-half said input angle.

14. A phase shifting network comprising a plurality of input terminals, an input circuit for applying to the respective input terminals a system of three-phase voltages, the angle of 120 electrical degrees between such system of voltage constituting the voltage input angle of said network, a branch circuit connected between each pair of input terminals to form a mesh network and each branch circuit comprising a fixed reactor having a winding and a direct current saturable reactor provided with a core and a first winding thereon connected in series relation with the winding of said fixed reactor and also being provided with a second winding on said core, direct current means for simultaneously varying the energization of each of said second windings so as to vary the reactance of each saturable reactor between predetermined maximum and minimum values, a plurality of output terminals provided at points around said network which alternate with said input terminals, and an output circuit connected to said output terminals for connection to a load circuit of impedance Z having a leading power factor angle of 60 electrical degrees, the value in ohms of said fixed reactor being equal to $\sqrt{3Z}$.

15. A phase shifting network comprising a plurality of input terminals, an input circuit for applying to the respective input terminals a system of three-phase voltages, the angle of 120 electrical degrees between such system of voltage constituting the voltage input angle of said network, a branch circuit connected between each pair of input terminals to form a mesh network and each branch circuit comprising a fixed reactor having a winding and a direct current saturable reactor provided with a core and a first winding thereon connected in series relation with the winding of said fixed reactor and also being provided with a second winding on said core, direct current means for simultaneously varying the energization of each of said second windings so as to vary the reactance of each saturable reactor between predetermined maximum and minimum values, a plurality of output terminals provided at points around said network which alternate with said input terminals, an output circuit connected to said output terminals for connection to a load circuit, and a capacitor connected to each of said output circuits and of a value such that the power factor angle of each output circuit is substantially equal to 60 electrical degrees, the value in ohms of each of said fixed reactors being equal to $\sqrt{3}$ times the impedance of each of said output circuits.

16. A phase shifting network comprising a plurality of input terminals, an input circuit for applying to the respective input terminals a system of three-phase voltages, the angle of 120 electrical degrees between such system of voltage constituting the voltage input angle of said network, a branch circuit connected between each pair of input terminals to form a mesh network and each branch circuit comprising a fixed reactor having a winding and a direct current saturable reactor provided with a core and a first winding thereon connected in series relation with the winding of said fixed reactor and also being provided with a second winding on said core, direct current means for simultaneously varying the energization of each of said second windings so as to vary the reactance of each saturable reactor between predetermined maximum and minimum values, a plurality of output terminals provided at points around said network which alternate with said input terminals, an output circuit including a load device of lagging power factor connected to said output terminals, and a capacitor connected in parallel relation with each of said load devices and of a value such that the power factor angle of each output circuit is substantially equal to 60 electrical degrees, the value in ohms of each said fixed reactor being equal to $\sqrt{3}$ times the impedance of each output circuit.

JOHN C. PRICE.

REFERENCES CITED

The following references are of record in the file of this patent:

UNITED STATES PATENTS

| Number | Name | Date |
|---|---|---|
| 1,926,275 | Fitzgerald | Sept. 12, 1933 |
| 2,042,234 | Lyle | May 26, 1936 |
| 2,362,294 | Mittag | Nov. 7, 1944 |
| 2,408,461 | Wickerham | Oct. 1, 1946 |
| 2,419,466 | Willis | Apr. 22, 1947 |